(12) United States Patent
Lin

(10) Patent No.: US 7,657,978 B2
(45) Date of Patent: Feb. 9, 2010

(54) SAFETY BUCKLE

(76) Inventor: Pei Chuan Lin, 6F-2, No. 16, Sec. 1, Huamei W. Street, Taichung City (TW) 40360

( * ) Notice: Subject to any disclaimer, the term of this patent is extended or adjusted under 35 U.S.C. 154(b) by 9 days.

(21) Appl. No.: 12/082,857

(22) Filed: Apr. 14, 2008

(65) Prior Publication Data

US 2009/0255101 A1 Oct. 15, 2009

(51) Int. Cl.
*A44B 11/25* (2006.01)
(52) U.S. Cl. .................. 24/614; 24/630; 24/662
(58) Field of Classification Search ........... 24/614–616, 24/625, 662, 310, 579.11, 605, 630, 697.1, 24/265 BC
See application file for complete search history.

(56) References Cited

U.S. PATENT DOCUMENTS 7,069,625 B2 * 7/2006 Liu ..................... 24/573.09
7,198,183 B2 * 4/2007 Yang ..................... 224/260

* cited by examiner

*Primary Examiner*—James R Brittain
(74) *Attorney, Agent, or Firm*—Pro-Techtor Int'l Services; Ralph Willgohs

(57) ABSTRACT

A safety buckle includes an intermediate buckle member, which has two opposite receiving holes and two smoothly arched grooves on the top and bottom sides in each receiving hole, and two connecting buckle members each having a plug insertable into the receiving holes of the intermediate buckle member and raised portions protruded from the top and bottom sides of the plug for engaging the smoothly arched grooves to secure the respective connecting buckle member to the intermediate buckle member for allowing the connecting buckle members to be biased relative to the intermediate buckle member within a predetermined angle. In an alternate form of the safety buckle, the locations of the raised portions and the locations of the smoothly arched grooves are exchanged.

12 Claims, 7 Drawing Sheets

SAFETY BUCKLE

BACKGROUND OF THE INVENTION

1. Field of the Invention

The present invention relates to buckles and more particularly, to a safety buckle that can be automatically unlocked when received a stretching force within a predetermined range of angles.

2. Description of the Related Art

U.S. Pat. No. 7,069,625 discloses a safety buckle 60. According to this design, the safety buckle 60 comprises a first female buckle member 80a, a second female buckle member 80b, and a male buckle member 70. The male buckle member 70 has two plug units 71a and 71b respectively inserted into the receiving open chamber 81a of a first female buckle member 80a and the receiving open chamber 81b of a second female buckle member 80b. Each plug unit 71a and 71b has two raised engagement portions 72a and 72b respectively protruded from the top and bottom sides for engaging respective recessed engagement portions 82a and 82b of the respective female buckle members 80a and 80b respectively.

The aforesaid safety buckle 60 is for use in a collar for cat. The collar can automatically be unfastened if the collar is detained by an object during jumping of the cat, preventing a hurt to the cat. In other words, the safety buckle is automatically unlocked to unfasten the collar from the cat for letting the cat go freely without hurt when the collar received a stretching force over the limited range (normally about 10 lbs or 5 kgs). A collar for cat is normally used for holding a nameplate, bell, or any of a variety of ornamental devices.

Because the female buckle members 80a and 80b of the aforesaid safety buckle 60 are not rotatable relative to the male buckle member 70, the safety buckle 60 can be easily unlocked only when the collar receives a stretching force in parallel to the direction of the central axis 75 extending through the safety buckle 60, i.e., the safety buckle 60 can be unlocked only when stretched in a particular angle. Therefore, the safety level of this design of safety buckle is not high.

SUMMARY OF THE INVENTION

The present invention has been accomplished under the circumstances in view. It is the main object of the present invention to provide a safety buckle, which can be automatically unlocked when received a stretching force within a predetermined range of angles, assuring safety.

To achieve this and other objects and according to one embodiment of the present invention, the safety buckle member is comprised of an intermediate buckle member, a first connecting buckle member, and a second connecting buckle member. The intermediate buckle member comprises a first receiving hole and a second receiving hole disposed at two opposite sides, and at least one smoothly arched groove formed in each of the first receiving hole and the second receiving hole. The first connecting buckle member comprises a first plug insertable into the first receiving hole of the intermediate buckle member, and at least one raised portion protruded from the first plug for engaging the at least one smoothly arched groove in the first receiving hole to secure the first connecting buckle member to the intermediate buckle member after insertion of the first plug of the first connecting buckle member into the first receiving hole of the intermediate buckle member for allowing the first connecting buckle member to be biased relative to the intermediate buckle member along the at least one smoothly arched groove in the first receiving hole within a predetermined angle. The second connecting buckle member comprises a second plug insertable into the second receiving hole of the intermediate buckle member, and at least one raised portion protruded from the second plug for engaging the at least one smoothly arched groove in the second receiving hole to secure the second connecting buckle member to the intermediate buckle member after insertion of the second plug of the second connecting buckle member into the second receiving hole of the intermediate buckle member for allowing the second connecting buckle member to be biased relative to the intermediate buckle member along the at least one smoothly arched groove in the second receiving hole within a predetermined angle.

In an alternate form of the present invention, the safety buckle is comprised of an intermediate buckle member, a first connecting buckle member, and a second connecting buckle member. The intermediate buckle member comprises a first plug and a second plug disposed at two opposite sides, and at least one raised portion protruded from each of the first plug and the second plug. The first connecting buckle member comprises a base and a first connection unit forwardly extending from the base. The first connection unit of the first connecting buckle member has a first receiving hole defined therein and at least one smoothly arched groove formed in the first receiving hole for receiving the at least one raised portion at the first plug to secure the first connecting buckle member to the intermediate buckle member for allowing the first connecting buckle member to be biased relative to the intermediate buckle member within a predetermined angle after insertion of the first plug into the first receiving hole of the first connection unit of the first connecting buckle member. The second connecting buckle member comprises a base and a second connection unit forwardly extending from the base. The second connection unit of the second connecting buckle member has a second receiving hole defined therein and at least one smoothly arched groove formed in the second receiving hole for receiving the at least one raised portion of the second plug to secure the second connecting buckle member to the intermediate buckle member for allowing the second connecting buckle member to be biased relative to the intermediate buckle member within a predetermined angle after insertion of the second plug into the second receiving hole of the second connection unit of the second connecting buckle member.

DETAILED DESCRIPTION OF THE PREFERRED EMBODIMENT

Figure 1:
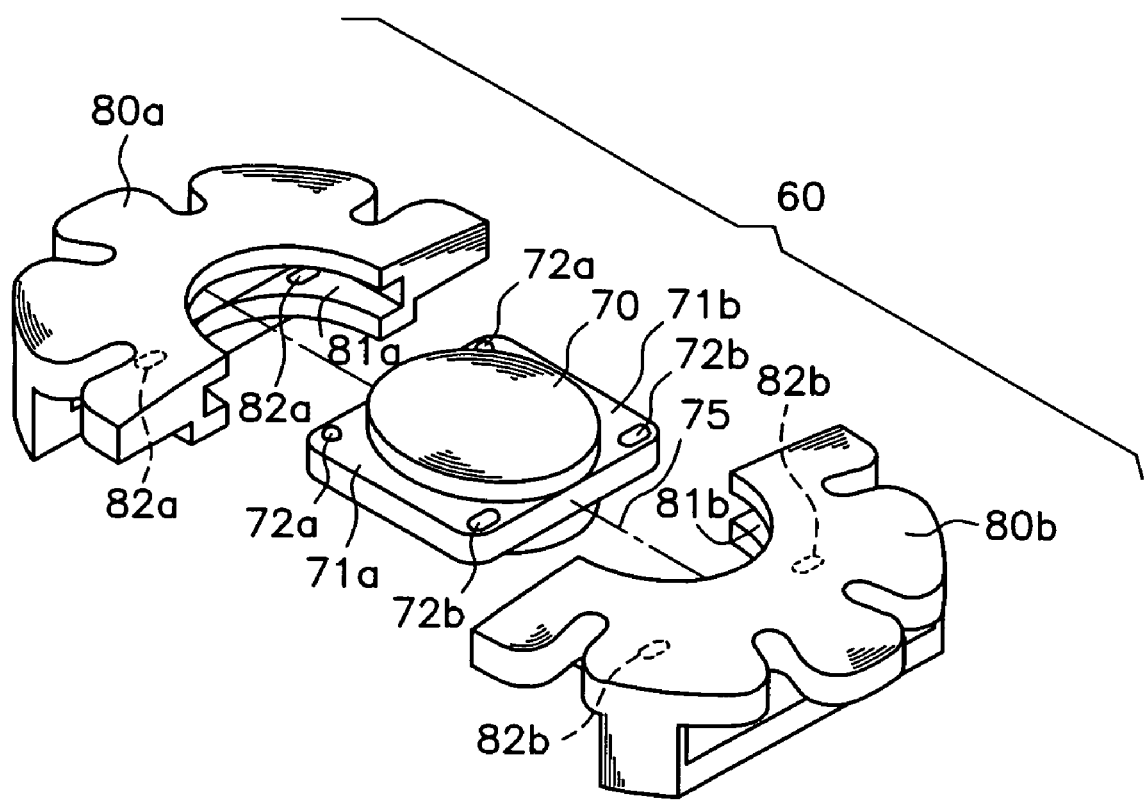
FIG. 1 is an exploded view of a safety buckle according to the prior art.
Figure 2:
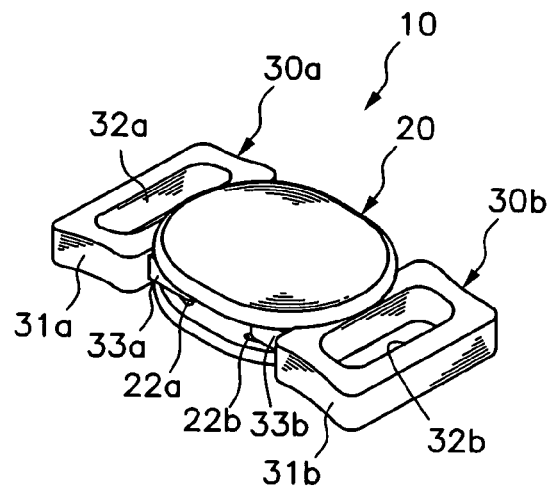
FIG. 2 is an elevational assembly view of a safety buckle in accordance with a first embodiment of the present invention.
Figure 3:
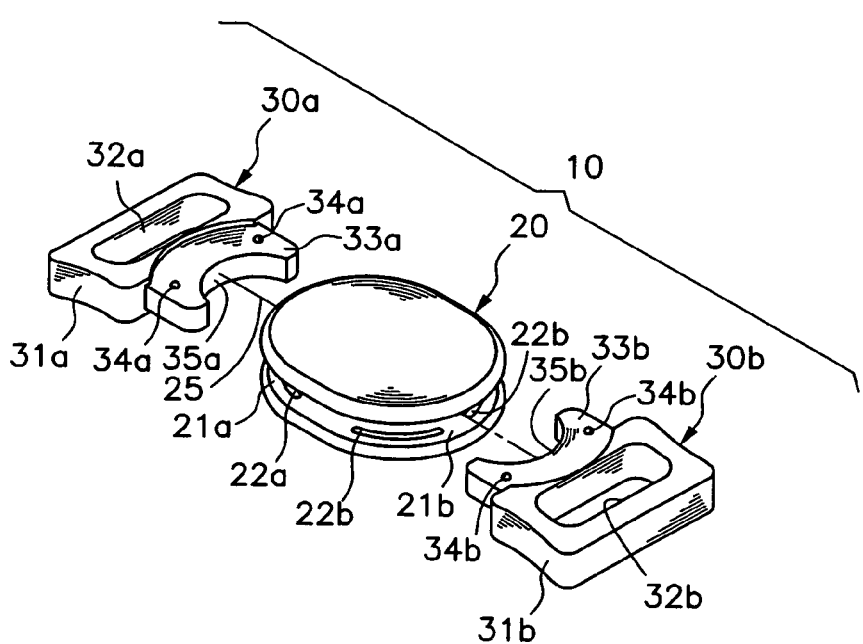
FIG. 3 is an exploded view of the safety buckle in accordance with the first embodiment of the present invention.
Figure 4:
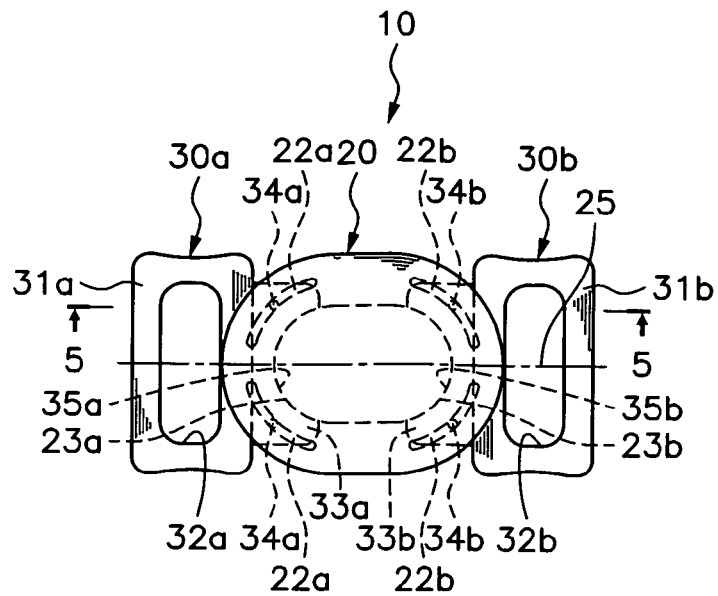
FIG. 4 is a top view of the safety buckle in accordance with a first embodiment of the present invention.
Figure 5:
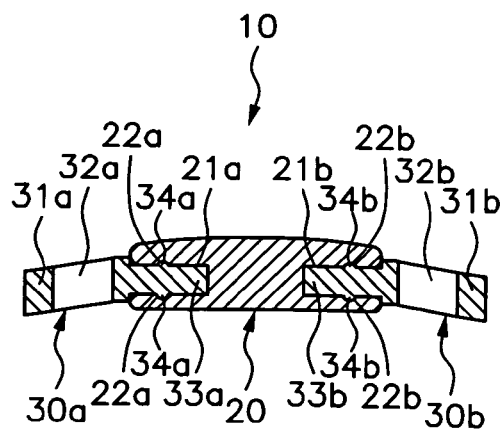
FIG. 5 is a sectional view taken along line 5-5 of FIG. 4.

Referring to FIGS. 2 through 5, a safety buckle 10 in accordance with a first embodiment of the present invention is shown comprised of an intermediate buckle member 20. The intermediate buckle member 20 comprises a first receiving hole 21a and a second receiving hole 21b symmetrically provided at two opposite sides, two symmetrical pairs of smoothly arched grooves 22a and 22b respectively formed in each of the first and second receiving holes 21a and 21b and bilaterally disposed at the top and bottom sides, i.e., there are four smoothly arched grooves 22a and 22b in each of the first and second receiving hole 21a and 21b. Actually, the two symmetrical smoothly arched grooves 22a and 22b on one same plane in one receiving hole 21a and 21b can be joined into one single smoothly arched groove.

The safety buckle 10 further comprises a first connecting buckle member 30a, and a second connecting buckle member 30b. The first connecting buckle member 30a comprises a base 31a, a belt hole 32a cut through the top and bottom sides of the base 31a for the insertion of one end of a fabric belt (not shown), a plug 33a forwardly extending from the base 31a for insertion into the first receiving hole 21a of the intermediate buckle member 20, and a plurality of raised portions 34a respectively protruded from the top and bottom sides of the plug 33a. According to this embodiment, the plug 33a has two raised portions 34a protruded from each of the top and bottom sides and symmetrically arranged at two sides, i.e., the plug 33a has totally four raised portions 34a respectively coupled to the smoothly arched grooves 22a in the first receiving hole 21a so that the first connecting buckle member 30a is biasable horizontally relative to the intermediate buckle member 20 within a predetermined angle.

The second connecting buckle member 30b has a structure same as the first connecting buckle member 30a, comprising a base 31b, a belt hole 32b cut through the top and bottom sides of the base 31b for the insertion of the other end of the fabric belt (not shown), a plug 33a forwardly extending from the base 31a for insertion into the second receiving hole 21b of the intermediate buckle member 20, and a plurality of raised portions 34b respectively protruded from the top and bottom wall of the plug 33b for coupling to the smoothly arched grooves 22b in the second receiving hole 21b of the intermediate buckle member 20 for allowing the second connecting buckle member 30b to be biased horizontally relative to the intermediate buckle member 20 within a predetermined angle.

Figure 6:
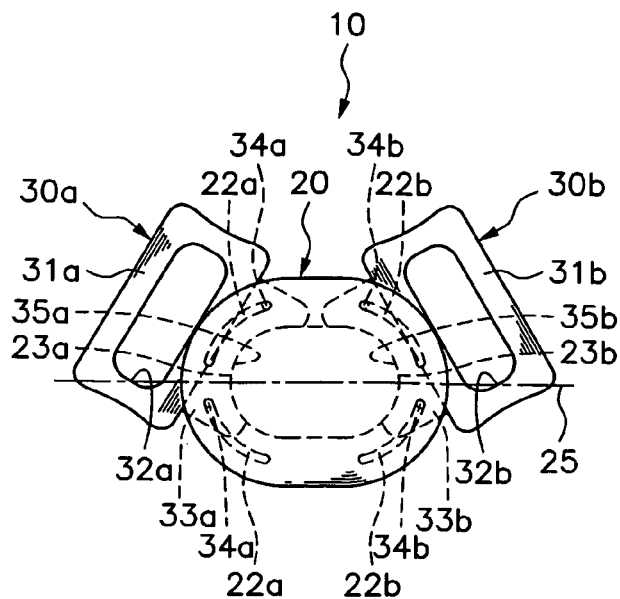
FIG. 6 is a top view of the first embodiment of the present invention, showing the first and second female buckle members biased horizontally to the limited range in one direction relative to the male buckle member.
Figure 7:
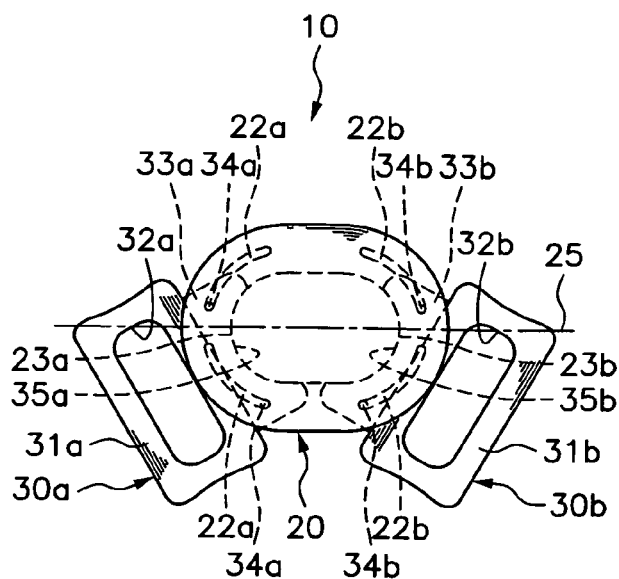
FIG. 7 is a top view of the first embodiment of the present invention, showing the first and second female buckle members biased horizontally to the limited range in the other direction relative to the male buckle member.
Figure 8:
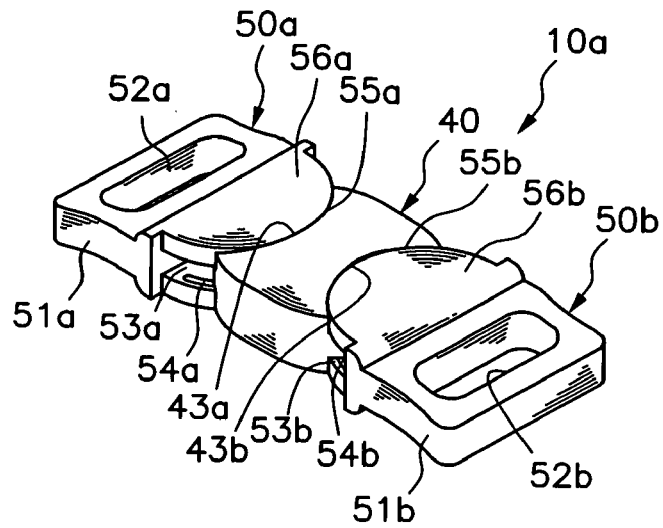
FIG. 8 is an elevational assembly view of a safety buckle in accordance with a second embodiment of the present invention.
Figure 9:
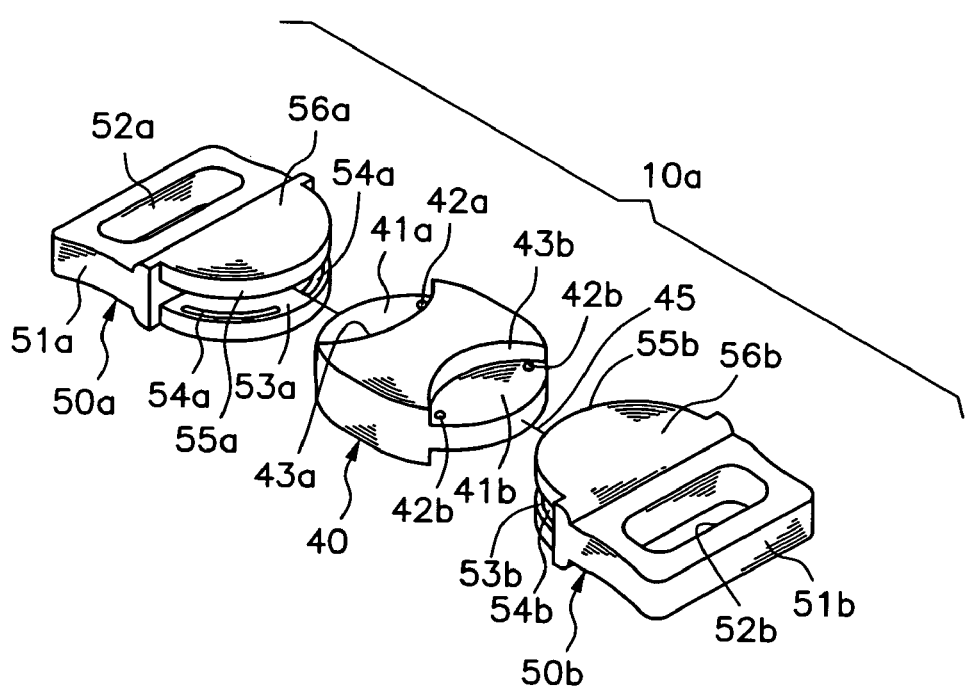
FIG. 9 is an exploded view of the safety buckle in accordance with the second embodiment of the present invention.
Figure 10:
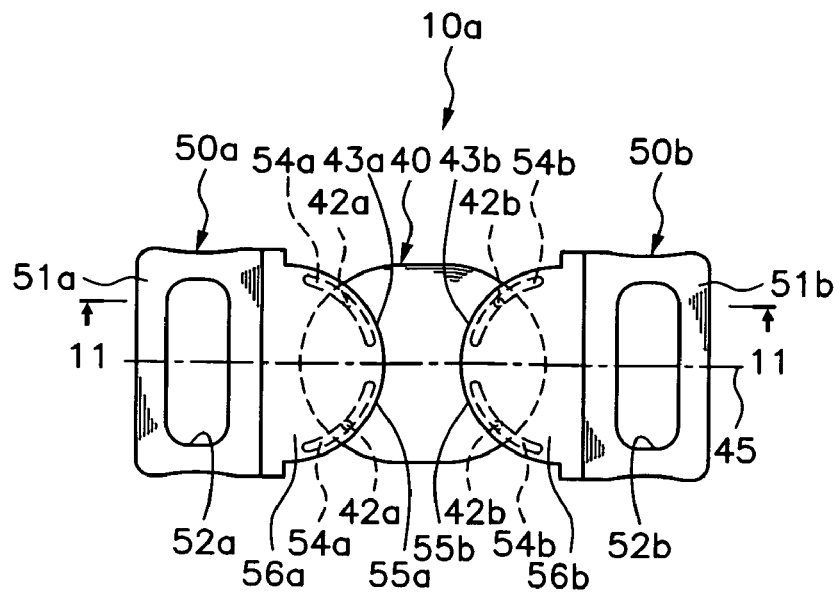
FIG. 10 is a top view of the safety buckle in accordance with the second embodiment of the present invention.
Figure 11:
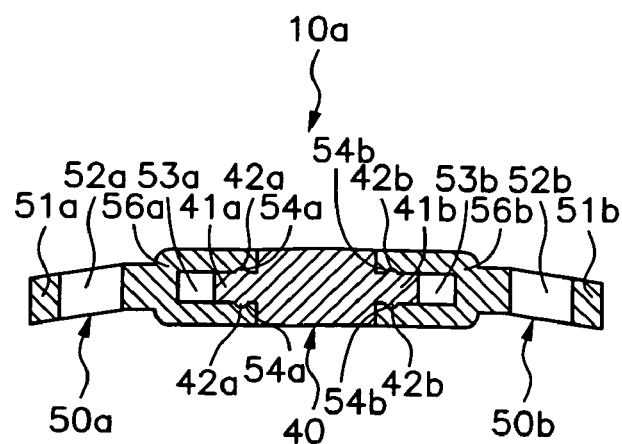
FIG. 11 is a sectional view taken along line 11-11 of FIG. 10.

To support horizontal biasing of the first connecting buckle member 30a and the second connecting buckle member 30b relative to the intermediate buckle member 20, the plug 33a and 33b has a female bearing portion 35a and 35b smoothly curved inwards at the front side; the intermediate buckle member 20 has a male bearing portion 23a and 23b smoothly curved outwards on the inside in each of the first and second receiving hole 21a and 21b. When the first connecting buckle member 30a and the second connecting buckle member 30b are fastened to the intermediate buckle member 20, the male bearing portions 23a and 23b of the plugs 33a and 33b match the female bearing portions 35a and 35b, allowing the first connecting buckle member 30a and the second connecting buckle member 30b to be biased horizontally relative to the intermediate buckle member 20 within about 60°, i.e. biased at 30° clockwise as well as counter-clockwise relative to the zero-degree central axis 25. FIGS. 6 and 7 show the first connecting buckle member 30a and the second connecting buckle member 30b biased horizontally to the limited angle relative to the intermediate buckle member 20 in two reversed directions.

Further, the intermediate buckle member 20 can be made having the smoothly arched grooves 22a and 22b formed in the first and second receiving holes 21a and 21b only at the top or bottom side. Under this condition, the first and second connecting buckle member 30a and 30b has the respective raised portions 34a and 34b provided at the top or bottom side of the plug 33a and 33b. However, it is preferable to have this first embodiment made in the form shown in FIGS. 2 through 5.

The invention is not limited to the aforesaid first embodiment. The safety buckle may be made in any other alternate forms. For example, the first and second receiving hole 21a and 21b of the intermediate buckle member 20 may be exchanged for the plugs 33a and 33b of the first and second connecting buckle members 30a and 30b, achieving the same effect of the aforesaid first embodiment. FIGS. 8 through 11 show a safety buckle 10a in accordance with a second embodiment of the present invention. According to this second embodiment, the intermediate buckle member 40 of the safety buckle 10a comprises a first plug 41a and a second plug 41b symmetrically disposed at two sides. Each plug 41a and 41b has two raised portions 42a and 42b protruded from each of the top and bottom sides thereof.

The first connecting buckle member 50a comprises a base 51a, which has a belt hole 52a cut through its top and bottom sides, and a connection unit 56a forwardly extending from the base 51a. The connection unit 56a has a receiving hole 53a defined therein for the insertion of the first plug 41a of the intermediate buckle member 40, and two symmetrical pairs of smoothly arched grooves 54a respectively bilaterally disposed at the top and bottom sides inside the receiving hole 53a. The smoothly arched grooves 54a receive the raised portions 42a of the first plug 41a of the intermediate buckle member 40 after insertion of the first plug 41a of the intermediate buckle member 40 into the receiving hole 53a of the connection unit 56a of the first connecting buckle member 50a, allowing the first connecting buckle member 50a to be biased horizontally relative to the intermediate buckle member 40 within a predetermined angle.

The second connecting buckle member 50b comprises a base 51b, which has a belt hole 52b cut through its top and bottom sides, and a connection unit 56b forwardly extending from the base 51b. The connection unit 56b has a receiving hole 53b defined therein for the insertion of the second plug 41b of the intermediate buckle member 40, and two symmetrical pairs of smoothly arched grooves 54b respectively bilaterally disposed at the top and bottom sides inside the receiving hole 53b. The smoothly arched grooves 54b receive the raised portions 42b of the second plug 41b of the intermediate buckle member 40 after insertion of the second plug 41b of the intermediate buckle member 40 into the receiving hole 53b of the connection unit 56b of the second connecting buckle member 50b, allowing the second connecting buckle member 50b to be biased horizontally relative to the intermediate buckle member 40 within a predetermined angle.

Figure 12:
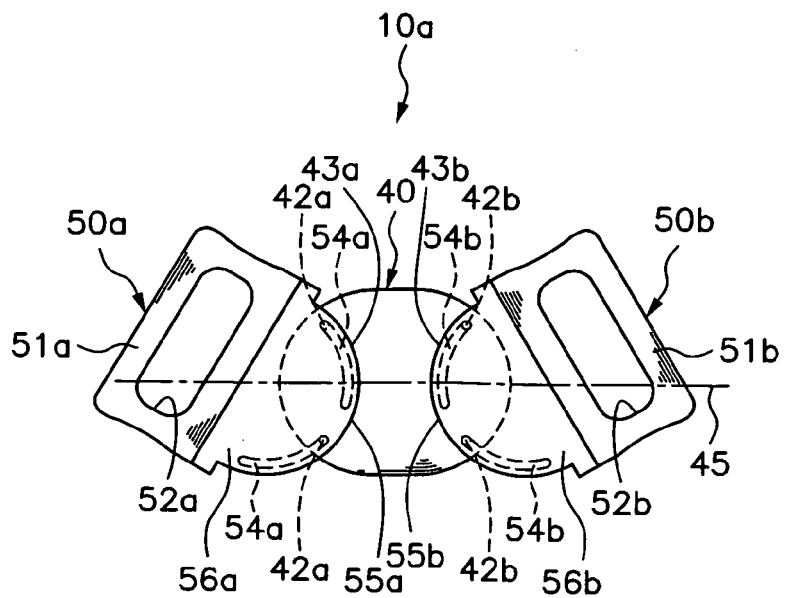
FIG. 12 is a top view of the second embodiment of the present invention, showing the first and second female buckle members turned in one direction relative to the male buckle member to the limited range.
Figure 13:
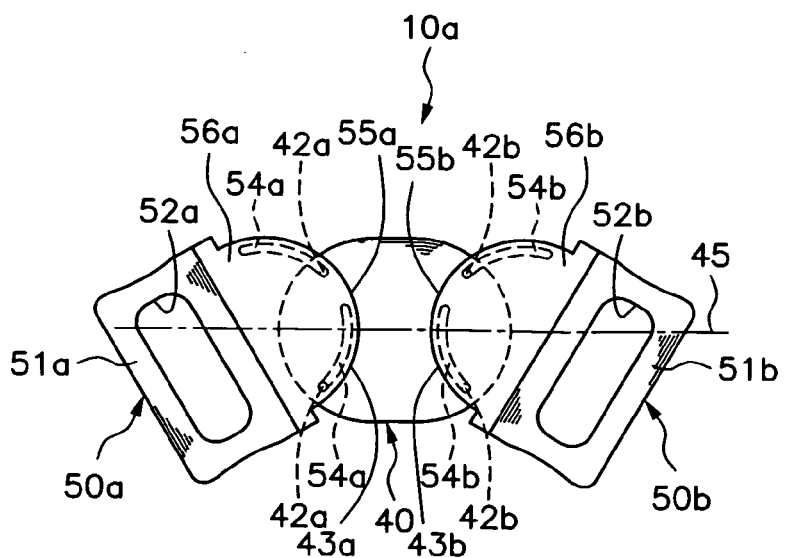
FIG. 13 is a top view of the second embodiment of the present invention, showing the first and second female buckle members turned in the other direction relative to the male buckle member to the limited range.

To support horizontal biasing of the first connecting buckle member 50a and the second connecting buckle member 50b relative to the intermediate buckle member 40, the intermediate buckle member 40 has female bearing portions 43a and 43b smoothly curved inwards and respectively at the top and bottom sides of the first and second plugs 41a and 41b; the first and second connecting buckle members 50a and 50b each have two male bearing portions 55a and 55b smoothly curved outwards at the top and bottom sides relative to the respective receiving hole 53a and 53b. When the first connecting buckle member 50a and the second connecting buckle member 50b are fastened to the intermediate buckle member 40, the female bearing portions 43a and 43b of the intermediate buckle member 40 match the male bearing portions 55a and 55b of the first and second connecting buckle members 50a and 50b, allowing the first connecting buckle member 50a and the second connecting buckle member 50b to be biased horizontally relative to the intermediate buckle member 40 within a predetermined angle, for example, 60°, i.e. biased at 30° clockwise as well as counter-clockwise relative to the zero-degree central axis 45. FIGS. 12 and 13 show the first connecting buckle member 50a and the second connecting buckle member 50b biased horizontally to the limited angle relative to the intermediate buckle member 40 in two reversed directions.

As stated above, the first connecting buckle member 30a (50a) and the second connecting buckle member 30b(50b) of the safety buckle 10(10a) are biasable horizontally relative to the intermediate buckle member 20(40) within about 60°. Therefore, the safety buckle 10(10a) is automatically unlocked when received a stretching force within this angle. When compared with the aforesaid prior art design that can be unlocked only with receives a stretching force in a particular angle.

Although particular embodiments of the invention have been described in detail for purposes of illustration, various modifications and enhancements may be made without departing from the spirit and scope of the invention.

What the invention claimed is:

1. A safety buckle, comprising:
   an intermediate buckle member, said intermediate buckle member comprising a first receiving hole disposed at a first side thereof, a second receiving hole disposed at a second side thereof opposite to said first side, and at least one smoothly arched groove formed in each of said first receiving hole and said second receiving hole;
   a first connecting buckle member, said first connecting buckle member comprising a first plug insertable into said first receiving hole of said intermediate buckle member, the first plug of said first connecting buckle member having at least one raised portion for engaging the at least one smoothly arched groove in said first receiving hole to secure said first connecting buckle member to said intermediate buckle member after insertion of the first plug of said first connecting buckle member into said first receiving hole of said intermediate buckle member for allowing said first connecting buckle member to be biased relative to said intermediate buckle member along the at least one smoothly arched groove in said first receiving hole within a predetermined angle; and
   a second connecting buckle member, said second connecting buckle member comprising a second plug insertable into said second receiving hole of said intermediate buckle member, the second plug of said second connecting buckle member having at least one raised portion for engaging the at least one smoothly arched groove in said second receiving hole to secure said second connecting buckle member to said intermediate buckle member after insertion of the second plug of said second connecting buckle member into said second receiving hole of said intermediate buckle member for allowing said second connecting buckle member to be biased relative to said intermediate buckle member along the at least one smoothly arched groove in said second receiving hole within a predetermined angle.

2. The safety buckle as claimed in claim 1, wherein the first plug of said first connecting buckle member and the second plug of said second connecting buckle member each have an inwardly curved bearing portion;
   said intermediate buckle member has two outwardly curved bearing portions respectively suspending inside said first receiving hole and said second receiving hole for abutting against the inwardly curved bearing portions of the plugs of said first connecting buckle member and said second connecting buckle member upon insertion of the first plug of said first connecting buckle member and the second plug of said second connecting buckle member into said first receiving hole and said second receiving hole of said intermediate buckle member.

3. The safety buckle as claimed in claim 1, wherein said at least one smoothly arched grooves are two in number and said at least one raised portions are two in number, and the two smoothly arched grooves and the two raised portions are symmetrically disposed respectively at two opposite lateral sides.

4. The safety buckle as claimed in claim 1, wherein said first plug and said second plug each have a top side and a bottom side, and the at least one raised portion of each of said first plug and said second plug is disposed at each of the respective top side and bottom side; said first receiving hole and said second receiving hole each has a top side and a bottom side, and the at least one smoothly arched grooves of said intermediate buckle member are disposed in the top side and bottom side of each of said first receiving hole and said second receiving hole respectively.

5. The safety buckle as claimed in claim 4, wherein the at least one raised portion includes two raised portions bilaterally disposed one on each of the respective top side and bottom side, and the at least one smoothly arched groove includes two smoothly arched grooves bilaterally disposed one at each of the respective top side and bottom side.

6. The safety buckle as claimed in claim 1, wherein said predetermined angle is 60 degrees angle.

7. A safety buckle, comprising:
   an intermediate buckle member, said intermediate buckle member comprising a first plug disposed at a first side thereof and a second plug disposed at a second side thereof opposite to said first side, said first plug and said second plug each having at least one raised portion;
   a first connecting buckle member, said first connecting buckle member comprising a base and a first connection unit forwardly extending from the base, the first connection unit of said first connecting buckle member having a first receiving hole defined therein and at least one smoothly arched groove formed in the first receiving hole for receiving the at least one raised portion of said first plug to secure said first connecting buckle member to said intermediate buckle member for allowing said first connecting buckle member to be biased relative to said intermediate buckle member within a predetermined angle after insertion of said first plug into the first receiving hole of the first connection unit of said fist connecting buckle member; and a second connecting buckle member, said second connecting buckle member comprising a base and a second connection unit forwardly extending from the base, the second connection unit of said second connecting buckle member having a second receiving hole defined therein and at least one smoothly arched groove formed in the second receiving hole for receiving the at least one raised portion of said second plug to secure said second connecting buckle member to said intermediate buckle member for allowing said second connecting buckle member to be biased relative to said intermediate buckle member within a predetermined angle after insertion of said second plug into the second receiving hole of the second connection unit of said second connecting buckle member.

8. The safety buckle member as claimed in claim 7, wherein said intermediate buckle member comprises a plurality of inwardly curved bearing portions respectively disposed at top and bottom sides of said first plug and said second plug; the first connection unit of said first connecting buckle member and the second connection unit of said second connecting buckle member each have an outwardly curved bearing portion which is respectively abutted against the inwardly curved bearing portions of said intermediate buckle member when said first plug and said second plug of said intermediate buckle member are respectively inserted into the first receiving hole of said first connecting buckle member and the second receiving hole of said second connecting buckle member.

9. The safety buckle as claimed in claim 7, wherein said at least one smoothly arched groove are two in number and said at least one raised portion are two in number, and each of the two smoothly arched grooves and each of the two raised portions respectively are symmetrically disposed at two opposite lateral sides.

10. The safety buckle as claimed in claim 7, wherein said first plug and said second plug each have a top side and a bottom side, and the at least one raised portion of each of said first plug and said second plug is disposed at each of the respective top side and bottom side; said first receiving hole and said second receiving hole each has a top side and a bottom side, and the at least one smoothly arched grooves of said first connecting buckle member and said second connecting buckle member are disposed in the top side and bottom side of each of said first receiving hole and said second receiving hole respectively.

11. The safety buckle as claimed in claim 10, wherein the at least one raised portion includes two raised portions bilaterally disposed one on each of the respective top side and bottom side, and the at least one smoothly arched groove includes two smoothly arched grooves bilaterally disposed one at each of the respective top side and bottom side.

12. The safety buckle as claimed in claim 7, wherein said predetermined angle is 60 degrees angle.

* * * * *